US011460073B2

(12) United States Patent
Noguchi et al.

(10) Patent No.: US 11,460,073 B2
(45) Date of Patent: Oct. 4, 2022

(54) THRUST WASHER (71) Applicant: TPR CO., LTD., Tokyo (JP)

(72) Inventors: Hideyoshi Noguchi, Tokyo (JP); Yasuyuki Yokoyama, Tokyo (JP)

(73) Assignee: TPR CO., LTD., Tokyo (JP)

(*) Notice: Subject to any disclaimer, the term of this patent is extended or adjusted under 35 U.S.C. 154(b) by 0 days.

(21) Appl. No.: 17/624,109

(22) PCT Filed: Aug. 24, 2021

(86) PCT No.: PCT/JP2021/030962
§ 371 (c)(1),
(2) Date: Dec. 30, 2021

(87) PCT Pub. No.: WO2022/091538
PCT Pub. Date: May 5, 2022

(65) Prior Publication Data
US 2022/0213928 A1 Jul. 7, 2022

(30) Foreign Application Priority Data

Oct. 29, 2020 (JP) ................................ 2020-181259

(51) Int. Cl.
*F16C 33/10* (2006.01)
*F16C 17/04* (2006.01)

(52) U.S. Cl.
CPC .......... *F16C 33/1065* (2013.01); *F16C 17/04* (2013.01)

(58) Field of Classification Search
CPC ...... F16C 17/04; F16C 17/045; F16C 33/106; F16C 33/1065; F16C 33/107
See application file for complete search history.

(56) References Cited

U.S. PATENT DOCUMENTS 1,176,833 A * 3/1916 Kennedy ............... F16C 33/103
384/415
4,615,231 A * 10/1986 Takahashi ............. F16H 57/082
184/6.12
(Continued)

FOREIGN PATENT DOCUMENTS

CN 109210179 A 1/2019
CN 209892612 A 1/2020
(Continued)

OTHER PUBLICATIONS

Office Action for Japanese Patent Application No. 2020-181259 (dated Feb. 9, 2021).

*Primary Examiner* — Alan B Waits
(74) *Attorney, Agent, or Firm* — Merchant & Gould P.C.

(57) ABSTRACT

Oil grooves (40) formed in at least one of surfaces of a ring-shaped member (30) each have a longitudinal direction that forms an angle falling within a range of from 40 degrees to 75 degrees with respect to a radial direction of the ring-shaped member, and are arranged at equal intervals in a circumferential direction of the ring-shaped member (30). The oil grooves (40) include communicating oil grooves (40A) and non-communicating oil grooves (40B) formed to extend to the vicinity of an outer peripheral end (34), and are arranged with periodic regularity in the circumferential direction of the ring-shaped member (30). In addition, a communicating oil groove area ratio expressed by Expression: "S1/(S1+S2)" falls within a range of from 0.15 to 0.85, where S1 represents a sum of plane areas of the communicating oil grooves (40A), S2 represents a sum of the non-communicating oil grooves (40B).

8 Claims, 4 Drawing Sheets

(56) References Cited

U.S. PATENT DOCUMENTS

| | | | | |
|---|---|---|---|---|
| 5,602,945 | A | * | 2/1997 | Davis .................. B02C 2/00 384/368 |
| 2010/0178166 | A1 | * | 7/2010 | Ammann ............. F16C 17/047 384/291 |
| 2019/0003571 | A1 | | 1/2019 | Okumoto et al. |
| 2022/0056949 | A1 | * | 2/2022 | Ikeda ................. F16C 33/1055 |

FOREIGN PATENT DOCUMENTS

| | | |
|---|---|---|
| CN | 111350753 A | 6/2020 |
| JP | 2007-016931 A | 1/2007 |
| JP | 2011-069460 A | 4/2011 |
| JP | 2017-025985 A | 2/2017 |
| JP | 2020-101239 A | 7/2020 |
| WO | 2020/129846 A1 | 6/2020 |

* cited by examiner

THRUST WASHER

CROSS REFERENCE TO RELATED APPLICATIONS

This is a U.S. national stage of application No. PCT/JP2021/030962, filed on Aug. 24, 2021, which claims benefit of Japanese Patent Applications No. 2020-181259, filed on Oct. 29, 2020, the disclosure of which is also incorporated herein by reference. To the extent appropriate, a claim of priority is made to each of the above disclosed applications.

TECHNICAL FIELD

The present invention relates to a thrust washer.

BACKGROUND

Thrust washers as described in, for example, Patent Literatures 1 and 2 are mounted in some machine devices such as clutch devices, transmissions, gear mechanisms, and compressors.

A thrust washer including a first oil path and a second oil path is disclosed in Patent Literature 1. The first oil path brings an inner peripheral surface and an outer peripheral surface of the thrust washer into communication with each other. The second oil path is dead-ended, specifically, is open to the inner peripheral surface of the thrust washer but is not open to the outer peripheral surface. This thrust washer achieves improvement of an effect of preventing abrasion, seizure, and an increase in friction (increase in loss torque).

Further, a thrust washer made of a material containing a resin is disclosed in Patent Literature 2. The thrust washer includes oil grooves formed on at least one of a front surface or a back surface thereof. An oil stop wall for preventing outflow of lubricating oil toward an outer periphery is provided at an outer peripheral end portion of at least one of the oil grooves. A sliding area ratio falls within a range of from 60% to 85%. The thrust washer achieves a reduction in sliding load (torque).

CITATION LIST

Patent Literature

[PTL 1] JP 2007-16931 A
[PTL 2] WO 2020/129846 A

SUMMARY OF INVENTION

Technical Problem

The thrust washers described in Patent Literatures 1 and 2 enable improvement of various kinds of sliding characteristics as described above. However, examinations conducted by the inventors of the present invention have proven that improvement of the characteristics described above is not sufficient for a thrust washer made of a resin-based material in some cases.

The present invention has been made in view of the circumstances described above, and has an object to provide a thrust washer that enables achievement of reductions in torque and abrasion and a decrease in torque amplitude width to suppress oil stain.

Solution to Problem

The object described above is achieved by the present invention to be described below.

That is, according to the present invention, there is provided a thrust washer, including a ring-shaped member made of a material containing a resin, the ring-shaped member having a front surface and a back surface, wherein at least one of the front surface or the back surface of the ring-shaped member slides against another member, wherein at least one of the front surface or the back surface has four or more oil grooves, each being a flow path for lubricating oil, wherein the oil grooves each have a longitudinal direction that forms an angle falling within a range of from 40 degrees to 75 degrees with respect to a radial direction of the ring-shaped member, and are arranged at equal intervals in a circumferential direction of the ring-shaped member, wherein the oil grooves include (i) communicating oil grooves, each having opening portions at an inner peripheral end and an outer peripheral end of the ring-shaped member, respectively, and each being a recessed portion formed continuously to connect the opening portion at the inner peripheral end and the opening portion at the outer peripheral end, and (ii) non-communicating oil grooves, each having an opening portion only at the inner peripheral end of the ring-shaped member having the inner peripheral end and the outer peripheral end, and each being a recessed portion formed continuously to extend from the opening portion at the inner peripheral end to a vicinity of the outer peripheral end, wherein a total number of the communicating oil grooves is two or more, wherein the communicating oil grooves and the non-communicating oil grooves are arranged with periodic regularity in the circumferential direction of the ring-shaped member, and wherein a communicating oil groove area ratio expressed by Expression (1)

$$\text{Communicating oil groove area ratio} = S1/(S1+S2)$$

falls within a range of from 0.15 to 0.85, where S1 represents a sum of plane areas (mm$^2$) of first to n-th communicating oil grooves, S2 represents a sum of plane areas (mm$^2$) of first to m-th non-communicating oil grooves, "n" represents a total number of the communicating oil grooves, and "m" represents a total number of the non-communicating oil grooves.

In the thrust washer according to one embodiment of the present invention, it is preferred that a total number of the oil grooves fall within a range of from 6 to 18.

In the thrust washer according to another embodiment of the present invention, it is preferred that the communicating oil groove area ratio fall within a range of from 0.230 to 0.680.

In the thrust washer according to another embodiment of the present invention, it is preferred that the communicating oil groove area ratio fall within a range of from 0.310 to 0.520.

In the thrust washer according to another embodiment of the present invention, it is preferred that the communicating oil groove area ratio fall within a range of from 0.310 to 0.350.

In the thrust washer according to another embodiment of the present invention, it is preferred that the angle formed between the longitudinal direction of each of the oil grooves and the radial direction of the ring-shaped member fall within a range of from 40 degrees to 65 degrees.

In the thrust washer according to another embodiment of the present invention, it is preferred that an oil groove length ratio expressed by Expression (2):

$$\text{Oil groove length ratio} = L1 / (L1 + L2)$$

falls within a range of from 0.90 to 0.99, where L1 represents a length (mm) in a longitudinal direction of the non-communicating oil groove, and L2 represents a length from an outer periphery-side most distal end portion of the non-communicating oil groove to the outer peripheral end of the ring-shaped member in a direction parallel to the longitudinal direction of the non-communicating oil groove.

In the thrust washer according to another embodiment of the present invention, it is preferred that the oil groove length ratio fall within a range of from 0.95 to 0.99.

In the thrust washer according to another embodiment of the present invention, it is preferred that the resin be a polyphenylene sulfide resin.

Advantageous Effects of Invention

According to the present invention, it is possible to provide a thrust washer that enables achievement of reductions in torque and abrasion and a decrease in torque amplitude width to suppress oil stain.

BRIEF DESCRIPTION OF DRAWINGS

FIG. 2 are schematic sectional views for illustrating examples of a sectional shape of an oil groove, in which

DESCRIPTION OF EMBODIMENT

Figure 1:
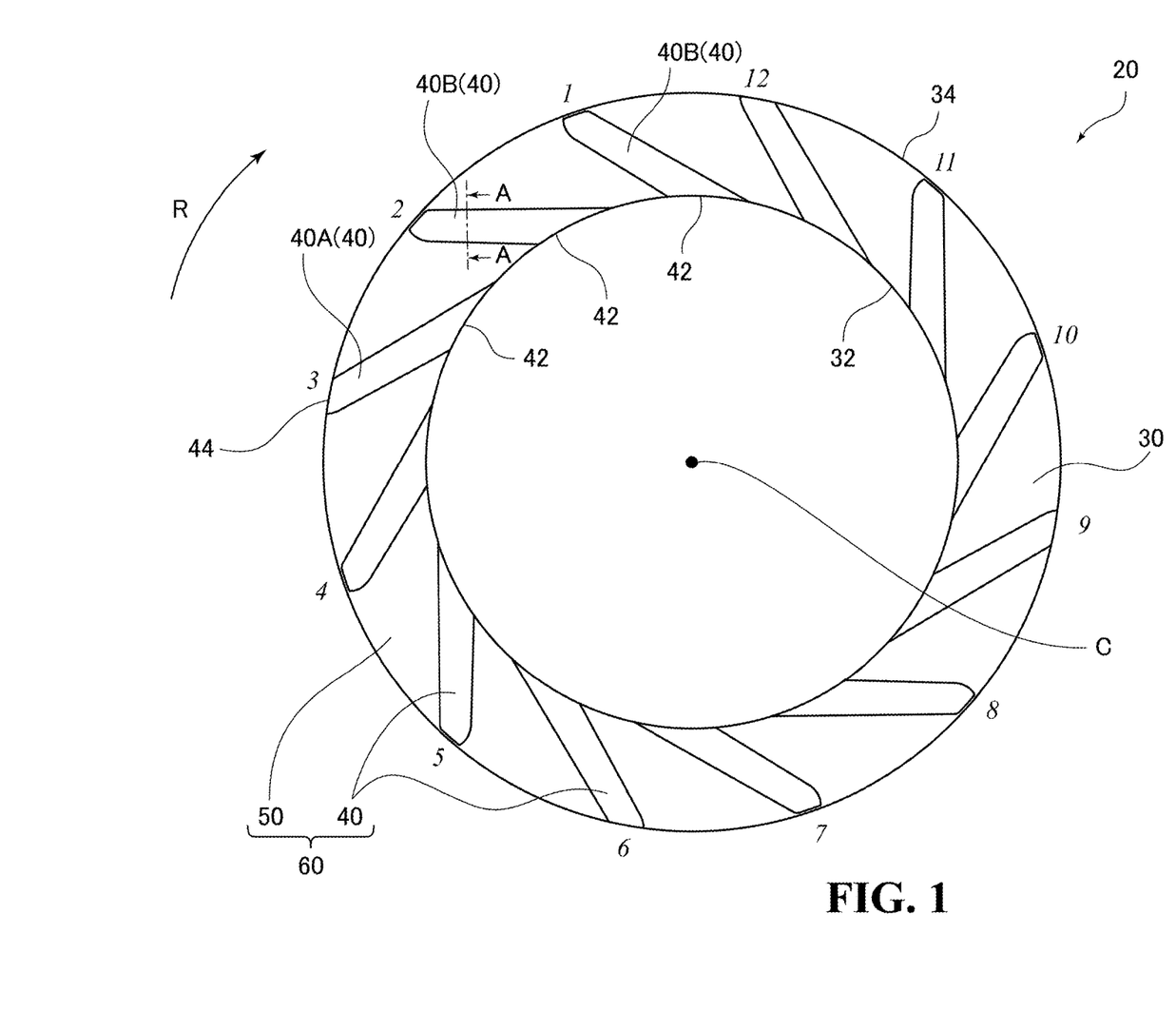
FIG. 1 is a plan view for illustrating a thrust washer according to one embodiment of the present invention.

FIG. 1 is a plan view for illustrating an example of a thrust washer according to this embodiment. The thrust washer according to this embodiment, which is exemplified in FIG. 1, specifically, a resin thrust washer 20 includes a ring-shaped member 30 made of a material containing a resin. At least one of a front surface or a back surface of the ring-shaped member 30 is a surface to slide against another member. At least one of the front surface or the back surface includes four or more oil grooves 40, each being a flow path for lubricating oil supplied from an inner periphery side of the ring-shaped member 30. In FIG. 1, a surface, specifically, an oil groove carrying surface 60 having twelve oil grooves 40 is illustrated. The oil groove carrying surface 60 is a surface to slide against another member. In this embodiment, in the example illustrated in FIG. 1, the oil groove carrying surface 60 has sliding surfaces 50 and the oil grooves 40. The sliding surfaces 50 are flat surfaces that are all flush with each other. The oil grooves 40 are formed to be recessed with respect to the sliding surfaces 50. For convenience of description, the reference numbers from "1" to "12" (numbers indicated in italic) are assigned to the twelve oil grooves 40 illustrated in FIG. 1 along a circumferential direction of the ring-shaped member 30 so that the oil grooves 40 can be individually identified with those numbers.

The oil grooves 40 each have a longitudinal direction that forms an angle falling within a range of from 40 degrees to 75 degrees with respect to a radial direction of the ring-shaped member 30, and are arranged at equal intervals in the circumferential direction of the ring-shaped member 30. In the example illustrated in FIG. 1, the angle (oil groove angle) formed between the longitudinal direction of each of the oil grooves 40 and the radial direction of the ring-shaped member 30 is set to 61 degrees, and a distance between adjacent two of the oil grooves 40 is set to 30 degrees in angle with a center axis C of the ring-shaped member 30 as a vertex.

Further, the oil grooves 40 include (i) communicating oil grooves 40A and (ii) non-communicating oil grooves 40B. In this embodiment, (i) each of the communicating oil grooves 40A has opening portions 42 and 44 at an inner peripheral end 32 and an outer peripheral end 34 of the ring-shaped member 30, respectively, and is a recessed portion formed continuously to connect the opening portion 42 at the inner peripheral end 32 and the opening portion 44 at the outer peripheral end 34. Further, (ii) each of the non-communicating oil grooves 40B has the opening portion 42 only at the inner peripheral end 32 of the ring-shaped member 30 having the inner peripheral end 32 and the outer peripheral end 34, and is a recessed portion formed continuously to extend from the opening portion 42 at the inner peripheral end 32 to the vicinity of the outer peripheral end 34. Further, a total number of the communicating oil grooves 40A is set to two or more. In the example illustrated in FIG. 1, a total number of the communicating oil grooves 40A is set to four.

Further, the communicating oil grooves 40A and the non-communicating oil grooves 40B are arranged with periodic regularity in the circumferential direction of the ring-shaped member 30. For the resin thrust washer 20 illustrated in FIG. 1, as shown in Table 1, two non-communicating oil grooves 40B are arranged in order in the circumferential direction of the ring-shaped member 30, and one communicating oil groove 40A is then arranged. This arrangement unit is repeated for four times over an entire circumference (from 0 degrees to 360 degrees) in the circumferential direction. Specifically, in the example illustrated in FIG. 1, the arrangement unit with regularity, which includes two non-communicating oil grooves 40B and one communicating oil groove 40A arranged in the stated order in the circumferential direction, is periodically repeated for four times in the circumferential direction. Thus, in the example illustrated in FIG. 1, the arrangement of two kinds of the oil grooves 40 has periodic regularity.

TABLE 1

| Number of oil groove 40 illustrated in FIG. 1 | Kind of oil groove 40 |
| --- | --- |
| 1 | Non-communicating oil groove 40B |
| 2 | Non-communicating oil groove 40B |

TABLE 1-continued

| Number of oil groove 40 illustrated in FIG. 1 | Kind of oil groove 40 |
| --- | --- |
| 3 | Communicating oil groove 40A |
| 4 | Non-communicating oil groove 40B |
| 5 | Non-communicating oil groove 40B |
| 6 | Communicating oil groove 40A |
| 7 | Non-communicating oil groove 40B |
| 8 | Non-communicating oil groove 40B |
| 9 | Communicating oil groove 40A |
| 10 | Non-communicating oil groove 40B |
| 11 | Non-communicating oil groove 40B |
| 12 | Communicating oil groove 40A |

Further, in the resin thrust washer 20 according to this embodiment has a communicating oil groove area ratio expressed by Expression (1), which falls within a range of from 0.15 to 0.85.

$$\text{Communicating oil groove ratio} = S1/(S1+S2) \quad \text{Expression (1)}$$

In Expression (1), S1 represents a sum of plane areas (mm$^2$) of first to n-th communicating oil grooves 40A, and S2 represents a sum of plane areas (mm$^2$) of first to m-th non-communicating oil grooves 40B. Here, "n" represents a total number of the communicating oil grooves 40A and "m" represents a total number of the non-communicating oil grooves 40B.

In the example illustrated in FIG. 1, "n" is set to 4, "m" is set to 8, and the communicating oil groove area ratio is set to 0.333.

The resin thrust washer 20 according to this embodiment includes the arrangement of combinations of the communicating oil grooves 40A and the non-communicating oil grooves 40B, which are arranged on the oil groove carrying surface 60 so as to satisfy various conditions described above. The summary of the conditions is described later as conditions (a) to (g). The arrangement described above enables reductions in torque and abrasion and a decrease in torque amplitude width to suppress oil stain. The "oil stain" is a phenomenon caused by a high temperature of the lubricating oil, in which a burning mark remains on a surface of a ring-shaped member included in a resin thrust washer. This burning mark (discoloration) is assumed to be a phenomenon caused by thermal denaturation of the resin contained in the ring-shaped member. For reference, "seizure" is a phenomenon caused by contact of a ring-shaped member included in a thrust washer with a counterpart member, in which part of a material itself of the ring-shaped member has a high temperature and melts. Thus, when the seizure occurs in the resin thrust washer, a melt mark is formed as a result of melting of the resin that forms the ring-shaped member. The oil stain causes a burning mark (discoloration) as described above, but does not cause a melt mark due to melting of the resin as occurring in the seizure.

(a) A total number of the oil grooves 40 is four or more.
(b) The oil groove angle falls within a range of from 40 degrees to 75 degrees.
(c) The oil grooves 40 are arranged at equal intervals in the circumferential direction of the ring-shaped member 30.
(d) The oil grooves 40 include (i) the communicating oil grooves 40A and (ii) the non-communicating oil grooves 40B.
(e) A total number of the communicating oil grooves 40A is two or more.
(f) The communicating oil grooves 40A and the non-communicating oil grooves 40B are arranged with periodic regularity in the circumferential direction of the ring-shaped member 30.
(g) The communicating oil groove area ratio falls within a range of from 0.15 to 0.85.

Details of the reasons why the above-mentioned effects are obtained are unclear. The inventors of the present invention assume the reasons as follows. First, when the lubricating oil is supplied from the opening portions 42 of the communicating oil grooves 40A, a large part of the supplied lubricating oil tends to be discharged from the opening portions 44. Meanwhile, when the lubricating oil is supplied from the opening portions 42 of the non-communicating oil grooves 40B, flow of the lubricating oil is stopped at distal end portions of the non-communicating oil grooves 40B that do not have the opening portions 44 on the outer periphery side. Thus, the supplied lubricating oil tends to flow out onto the sliding surfaces 50 and easily form an oil film thereon. However, the distal end portions of the non-communicating oil grooves 40B on the outer periphery side and the outer peripheral end 34 of the ring-shaped member 30 are extremely close to each other. Thus, more precisely, part of the supplied lubricating oil flows out onto the sliding surfaces 50. At the same time, a remaining part of the lubricating oil easily passes over the distal end portions of the non-communicating oil grooves 40B on the outer periphery side and the outer peripheral end 34 of the ring-shaped member 30 to be discharged toward the outer periphery side of the ring-shaped member 30. Specifically, the communicating oil grooves 40A have only a stagnation suppression function for the lubricating oil. However, the non-communicating oil grooves 40B have both of an oil film securing function (oil film forming function) and the stagnation suppression function for the lubricating oil.

Thus, when the oil groove carrying surface 60 has only the communicating oil grooves 40A as the oil grooves 40 (communicating oil groove area ratio=1.00), a large part of the lubricating oil supplied to the communicating oil grooves 40A is smoothly discharged to the outer periphery side of the ring-shaped member 30 via the opening portions 44. Thus, it is considered that the amount of supply of the lubricating oil onto the sliding surfaces 50 may tend to be insufficient. In this case, oil film shortage (phenomenon in which the sliding surfaces 50 fail to be covered with an oil film) is more liable to occur on part of the sliding surfaces 50. Meanwhile, when the oil groove carrying surface 60 has only the non-communicating oil grooves 40B as the oil grooves 40 (communicating oil groove area ratio=0.00), part of the lubricating oil supplied to each of the non-communicating oil grooves 40B flows out onto the sliding surfaces 50. Such a phenomenon occurs for all the non-communicating oil grooves 40B at the same time. Thus, the lubricating oil overflowing in the vicinity of the outer peripheral end 34 without being discharged toward the outer peripheral end 34 flows back toward an inner periphery side of the non-communicating oil grooves 40B. It is considered that the backflow may cause oil film unevenness (phenomenon in which a thickness of the oil film covering the sliding surfaces 50 varies) on part of the sliding surfaces 50.

However, when the communicating oil grooves 40A and the non-communicating oil grooves 40B are arranged in combination on the oil groove carrying surface 60 so as to satisfy the conditions (d) and (g), a proper amount of lubricating oil can be supplied evenly onto the entire sliding surfaces 50 in comparison to a case in which only the communicating oil grooves 40A are formed as the oil grooves 40 in the oil groove carrying surface 60 (communicating oil groove area ratio=1.00) and a case in which only the non-communicating oil grooves 40B are formed as the oil grooves 40 in the oil groove carrying surface 60 (communicating oil groove area ratio=0.00). Thus, not only occurrence of the oil film shortage, which may cause seizure or the like, can be suppressed, but also oil film unevenness can extremely easily be suppressed. As a result, along with reductions in torque and abrasion, the torque amplitude width can be decreased to enable suppression of the oil stain.

To achieve the condition (d), it is extremely important that each of the non-communicating oil grooves 40B be an oil groove extending from the opening portion 42 on the inner peripheral end 32 side to the vicinity of the outer peripheral end 34. The reason for this is as follows. First, when the resin thrust washer 20 is in a rotating state (rotation in a direction indicated by an arrow R in FIG. 1), a centrifugal force acting in the radial direction from the inner periphery side toward the outer periphery side and a force acting in the circumferential direction opposite to the rotating direction R of the resin thrust washer 20 are constantly applied to the lubricating oil supplied into the non-communicating oil grooves 40B. Thus, when only the oil film securing function (oil film forming function) is taken into consideration, it is extremely suitable that the non-communicating oil grooves are not (i) the non-communicating oil grooves 40B, each being formed to extend from the opening portion 42 on the inner peripheral end 32 side to the vicinity of the outer peripheral end 34 as exemplified in FIG. 1, but are (ii) non-communicating oil grooves, each being formed to extend from the opening portion 42 on the inner peripheral end 32 side to a middle in the radial direction as second oil path exemplified in FIG. 2, FIG. 7, and FIG. 9 of Patent Literature 1. Specifically, a certain distance is defined between the distal end portion of each of the oil grooves on the outer periphery side and the outer peripheral end 34 of the ring-shaped member 30. The non-communicating oil groove described above is hereinafter referred to as "oil film securing function-specific non-communicating oil groove").

The oil film securing function-specific non-communicating oil grooves are suitable for the following reason. In (i) each of the non-communicating oil grooves 40B, <a> the lubricating oil in a region other than the vicinity of the distal end portion of the non-communicating oil groove 40B on the outer periphery side is supplied onto the sliding surfaces 50 by a force acting in the circumferential direction, contributing to the formation of the oil film. However, <b> the lubricating oil in the vicinity of the distal end portion of the non-communicating oil groove 40B on the outer periphery side immediately reaches the outer peripheral end 34 of the ring-shaped member 30 due to the centrifugal force. Thus, the lubricating oil substantially little contributes to the formation of the oil film. Meanwhile, in (ii) each of the oil film securing function-specific non-communicating oil grooves, <a> the lubricating oil in a region other than the vicinity of the distal end portion of the oil film securing function-specific non-communicating oil groove on the outer periphery side is supplied onto the sliding surfaces 50 by the force acting in the circumferential direction, contributing to the formation of the oil film. At the same time, <b> the lubricating oil in the vicinity of the distal end portion of the oil film securing function-specific non-communicating oil groove on the outer periphery side is moved onto the sliding surfaces 50 (is expanded to the outer periphery side beyond the distal end of the oil film securing function-specific non-communicating oil groove on the outer periphery side) by the centrifugal force, and can contribute to the formation of the oil film. Specifically, (i) the non-communicating oil grooves 40B do not allow efficient use of a full amount of the lubricating oil supplied from the opening portions 42 for the formation of the oil film, and thus are significantly inferior to (ii) the oil film securing function-specific non-communicating oil grooves in terms of the oil film securing function.

However, the amount and a direction of outflow of the lubricating oil, and a region to which the lubricating oil is caused to flow out onto the sliding surfaces 50 by the force acting in the circumferential direction are totally different from those of the lubricating oil caused to flow out onto the sliding surfaces 50 by the centrifugal force. Thus, (ii) the oil film securing function-specific non-communicating oil grooves that supply the lubricating oil onto the sliding surfaces 50 by both of the force acting in the circumferential direction and the centrifugal force are more liable to cause unevenness in oil film distribution than (i) the non-communicating oil grooves 40B that allow supply of the lubricating oil onto the sliding surfaces 50 substantially only by the force acting in the circumferential direction. Thus, when (ii) the oil film securing function-specific non-communicating oil grooves are used, the following is considered. A sufficient oil film securing function can be obtained. However, unevenness is liable to occur in the oil film distribution. Further, the lubricating oil at high temperature is liable to be stagnant on the sliding surfaces 50 as the oil film due to the sufficient oil film securing function, which may conversely lead to increases in torque and abrasion and aggravation of the oil stain.

In view of the circumstances described above, the inventors of the present invention consider that it is important to intentionally use (i) the non-communicating oil grooves 40B. (i) The non-communicating oil grooves 40B are significantly inferior to (ii) the oil film securing function-specific non-communicating oil grooves in terms of the oil film securing function. However, (i) the non-communicating oil grooves 40B are less liable to cause unevenness in the oil film distribution, and are less liable to cause stagnation of the oil film of the lubricating oil at high temperature on the sliding surfaces 50 than the oil film securing function-specific non-communicating oil grooves.

Meanwhile, when the resin thrust washer 20 slides against a counterpart member, frictional heat is generated. Thus, it is also important to suppress heating of the resin thrust washer 20 with the frictional heat, specifically, cool the resin thrust washer 20. In this case, in view of heating and cooling of the resin thrust washer 20, the communicating oil grooves 40A have a stagnation suppressing function for the lubricating oil having an oil temperature increased by the frictional heat, and have a cooling effect. The oil film securing function-specific non-communicating oil grooves have the oil film securing function for causing the lubricating oil having the oil temperature increased by the frictional heat, stagnating on the sliding surfaces 50 and promoting the formation of the oil film, and have a heating effect. Thus, when the communicating oil grooves 40A and the oil film securing function-specific non-communicating oil grooves are arranged in combination on the oil groove carrying surface 60, the heating effect of the oil film securing function-specific non-communicating oil grooves may overwhelm the cooling effect of the communicating oil grooves 40A depending on balance between the communicating oil grooves 40A and the oil film securing function-specific non-communicating oil grooves in arrangement, leading to a possibility of causing the oil stain. Meanwhile, the non-communicating oil grooves 40B smoothly discharge the lubricating oil in the vicinities of the distal end portions of the non-communicating oil grooves 40B on the outer periphery side toward the outer periphery of the ring-shaped member 30. Thus, it is considered that the non-communicating oil grooves 40B contribute not to the heating effect but to the cooling effect for the lubricating oil. Specifically, it is assumed that the non-communicating oil grooves 40B have the heating effect lower than that of the oil film securing function-specific non-communicating oil grooves or an extremely weak cooling effect. Thus, when the communicating oil grooves 40A and the non-communicating oil grooves 40B are arranged in combination on the oil groove carrying surface 60, it is considered that the oil stain hardly occurs in comparison to the case in which the communicating oil grooves 40A and the oil film securing function-specific non-communicating oil grooves are arranged in combination on the oil groove carrying surface 60.

As described above, it is extremely important to satisfy the conditions (d) and (g). As a result of the examination conducted by the inventors of the present invention, however, satisfying only the conditions (d) and (g) does not allow the effects of reducing the torque and abrasion and decreasing the torque amplitude width to suppress the oil stain to be always stably obtained. Thus, a further examination conducted by the inventors of the present invention has proven that satisfying the conditions (a) to (c), and (e) and (f) in addition to the conditions (d) and (g) enables the above-mentioned effects to be extremely stably obtained. The reason for this is assumed as follows. When the conditions (a) to (c), and (e) and (f) are additionally satisfied, the lubricating oil in the oil grooves 40 can be more evenly supplied to the entire sliding surfaces 50 to achieve a more even oil film distribution.

When the conditions (a) to (g) are satisfied as described above, it becomes extremely easy to evenly supply a proper amount of lubricating oil onto all the entire sliding surfaces 50. Consequently, the above-mentioned effects are stably obtained.

Further, the resin thrust washer 20 according to this embodiment enables significant suppression of the occurrence of the oil film shortage on the sliding surfaces 50. Thus, it is considered that a state in which a counterpart member and the ring-shaped member 30 are brought into direct contact with and slide against each other without intermediation of the oil film can also be significantly suppressed. Based on the above-mentioned fact, even when various kinds of sliding characteristics resulting from a resin material itself for forming the ring-shaped member 30 are fundamentally poor, the resin thrust washer 20 according to this embodiment facilitates achievement of excellent sliding characteristics. Thus, for the resin thrust washer 20 according to this embodiment, it is extremely easy to use a resin (for example, a polyphenylene sulfide resin) having various kinds of fundamentally poor sliding characteristics resulting from the material itself in place of a resin (for example, a polyimide resin) having various kinds of fundamentally excellent sliding characteristics resulting from the material itself. Thus, the resin thrust washer 20 according to this embodiment allows selection of a resin material from a wider variety of resin materials than those for related-art thrust washers. Thus, manufacturing cost can easily be reduced by using a low-cost resin material. As a matter of course, a resin having various kinds of fundamentally excellent sliding characteristics resulting from the material itself may be used for the resin thrust washer 20 according to this embodiment. In this case, improved sliding characteristics can be ensured.

Next, details of the resin thrust washer 20 according to this embodiment are described in order.

The ring-shaped member 30 included in the resin thrust washer 20 according to this embodiment has four or more oil grooves 40 formed on at least one of the front surface or the back surface. When the number of oil grooves 40 is less than four, a distance between adjacent two of the oil grooves 40 in the circumferential direction becomes excessively large even with arrangement of the oil grooves at equal intervals. Thus, the oil film shortage is liable to occur, and the torque amplitude width increases due to a local increase in fictional force in a region in which the oil film shortage has occurred. As a result, an increase in torque, abrasion, or the like is liable to be brought about. Further, the above-mentioned number of oil grooves does not allow the arrangement of the communicating oil grooves 40A and the non-communicating oil grooves 40B with periodic regularity in the circumferential direction of the ring-shaped member 30. Specifically, the condition (f) is not satisfied. Meanwhile, an upper limit value of the number of the oil grooves 40 is not limited to a particular value. In practice, however, it is preferred that the number of the oil grooves 40 be twenty or less. A total number of the oil grooves 40 preferably falls within a range of from 6 to 18, more preferably, from 6 to 15. Further, an upper limit value of a total number of the communicating oil grooves 40A is not limited to a particular value as long as it is two or more. In practice, it is preferred the total number of the oil grooves 40A be twelve or less. The total number of the communicating oil grooves 40A preferably falls within a range of from 2 to 10, more preferably, from 3 to 8, further preferably, from 4 to 6.

Further, the oil grooves 40 are arranged so that the longitudinal direction of each of the oil grooves 40 forms an angle (oil groove angle) falling within a range of from 40 degrees to 75 degrees with respect to the radial direction of the ring-shaped member 30, and are arranged at equal intervals in the circumferential direction of the ring-shaped member 30. When the oil groove angle is less than 40 degrees, the torque, the torque amplitude width, and the abrasion remarkably increase. At the same time, the oil stain aggravates. Meanwhile, in practice, an upper limit value of the oil groove angle is 75 degrees. This is because it is difficult to form the oil grooves 40, each having the oil groove angle of 75 degrees or more, in the ring-shaped member 30. For easiness of reduction in torque, abrasion, and torque amplitude while suppressing oil stain, the oil groove angle preferably falls within a range of from 40 degrees to 65 degrees, more preferably, from 45 degrees to 63 degrees. Specific definition of the oil groove angle is described later.

The oil grooves 40 are arranged at "equal intervals" in the circumferential direction of the ring-shaped member 30. This arrangement easily achieves a more even oil film distribution in the circumferential direction of the ring-shaped member 30. In this case, the expression "equal intervals" includes not only completely equal intervals but also substantially equal intervals. When a total number of the oil grooves 40 is set to "p" ("p" is an integer equal to or larger than 4) and the oil grooves 40 are arranged at completely equal intervals, a distance between adjacent two of the oil grooves 40 in the circumferential direction is set to 360/p degrees in angle with the center axis C of the ring-shaped member 30 as a vertex. Meanwhile, when the oil grooves 40 are arranged at substantially equal intervals, an angle is selected within a range of ±10% with respect to 360/p degrees in angle being a reference value (100%), preferably, within a range of ±5%. Thus, when a total number of the oil grooves 40 is twelve as exemplified in FIG. 1 and the oil grooves 40 are arranged at completely equal intervals, a distance between adjacent two of the oil grooves 40 in the circumferential direction is 30 degrees (=360 degrees/12) in angle for all the distances. Meanwhile, when the oil grooves 40 are arranged at substantially equal intervals, a distance between adjacent two of the oil grooves 40 in the circumferential direction is selected from a range of from 27 degrees to 33 degrees (excluding 30 degrees) in angle.

Further, the oil grooves 40 are recessed portions with respect to the sliding surfaces 50, and include the communicating oil grooves 40A and the non-communicating oil grooves 40B. A planar shape and a sectional shape of each of the communicating oil grooves 40A are not limited to particular shapes as long as the recessed portion is formed continuously from the opening portion 42 at the inner peripheral end 32 to the opening portion 44 at the outer peripheral end 34. Further, a planar shape and a sectional shape of each of the non-communicating oil grooves 40B are not limited to particular shapes as long as the recessed portion is formed continuously from the opening portion 42 at the inner peripheral end 32 to the vicinity of the outer peripheral end 34. FIG. 2 are schematic sectional views for illustrating examples of the sectional shape of the oil groove 40, more specifically, for illustrating sectional shapes taken along a plane indicated by the line A-A illustrated in FIG. 1, which is orthogonal to the longitudinal direction of the non-communicating oil groove 40B. FIG. 2 are illustrations of the sectional shapes of the non-communicating oil groove 40B. However, as a matter of course, the communicating oil groove 40A may have similar sectional shapes.

Figure 2A:
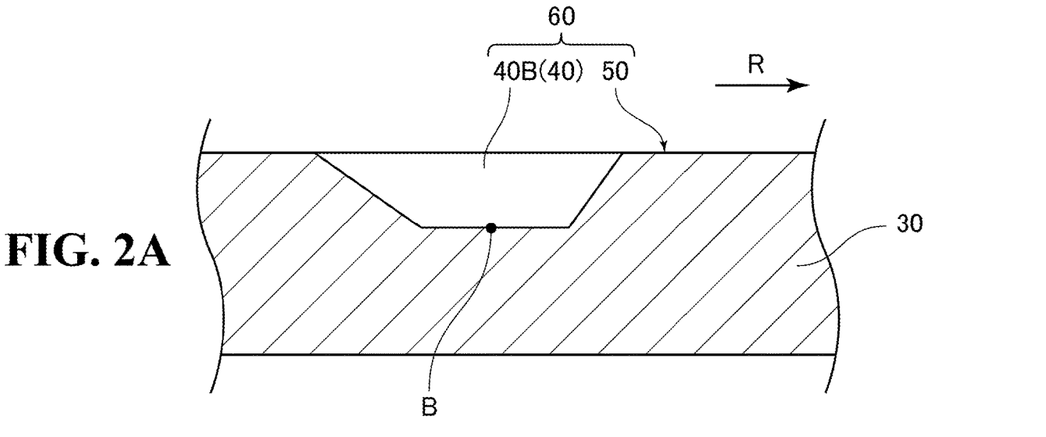
FIG. 2(A) is a schematic sectional view for illustrating an example of an oil groove having an inverted trapezoidal sectional shape.
Figure 2B:
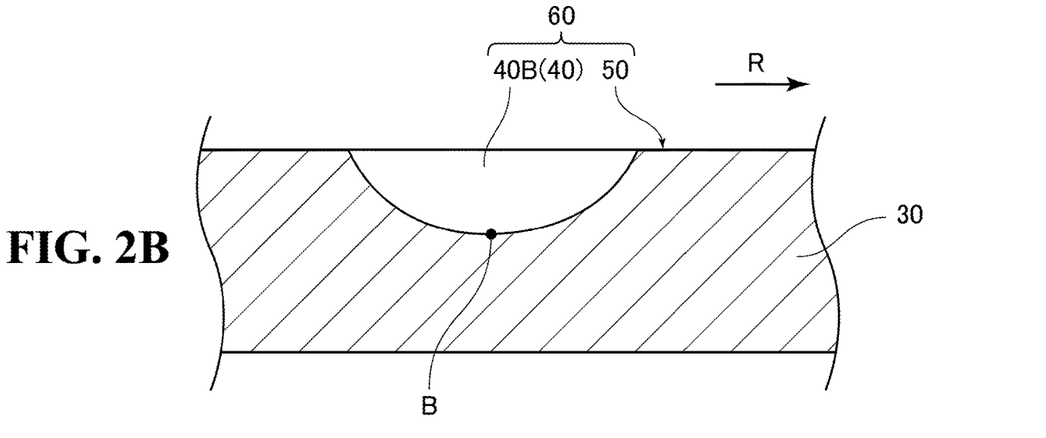
FIG. 2(B) is a schematic sectional view for illustrating an example of an oil groove having an arc-like sectional shape.
Figure 2C:
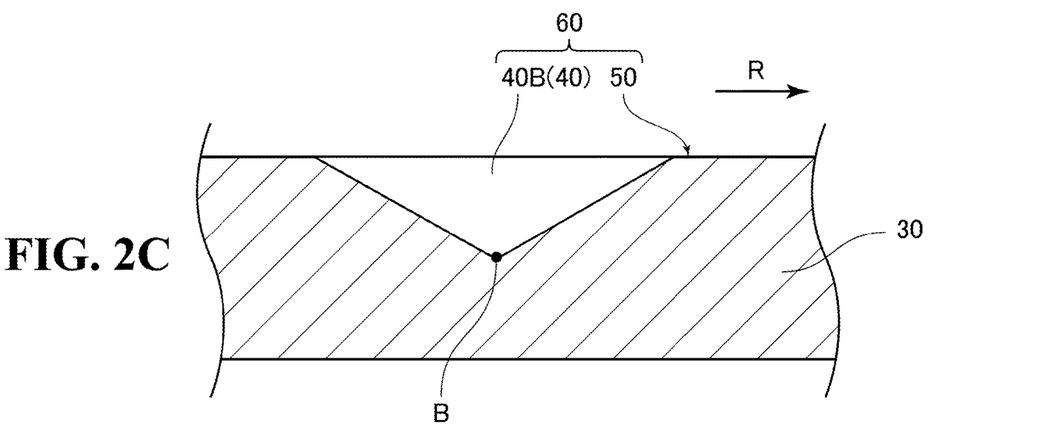
FIG. 2(C) is a schematic sectional view for illustrating an example of an oil groove having a V-like sectional shape.

As exemplified in FIG. 2, examples of the sectional shape of the oil groove 40 include an inversed trapezoidal shape (FIG. 2(A)), an arc-like shape (FIG. 2(B)), and a V-like shape (FIG. 2(C)). Other sectional shapes (for example, a U-like shape) may be used. Further, the oil groove 40 may have an asymmetric sectional shape with respect to a straight line dividing the oil groove 40 into two in a width direction of the oil groove 40 as illustrated in FIG. 2(A). The oil groove 40 may also have a symmetric sectional shape as illustrated in FIG. 2(B) and FIG. 2(C). A position indicated by the reference symbol B in FIG. 2 corresponds to a center line of the planar shape of the oil groove 40 extending in the longitudinal direction. The center line B of the oil groove 40 extending in the longitudinal direction is a straight line passing through a deepest position in the oil groove 40 as illustrated in FIG. 2, and is determined based on a position at which a groove depth in the vicinity of a central portion of the oil groove 40 in the longitudinal direction is maximum. However, when the oil groove 40 has a flat bottom surface with a constant groove depth as illustrated in FIG. 2(A), a central portion of the bottom surface in the width direction is defined as a position corresponding to the center line B in the longitudinal direction.

Figure 3:
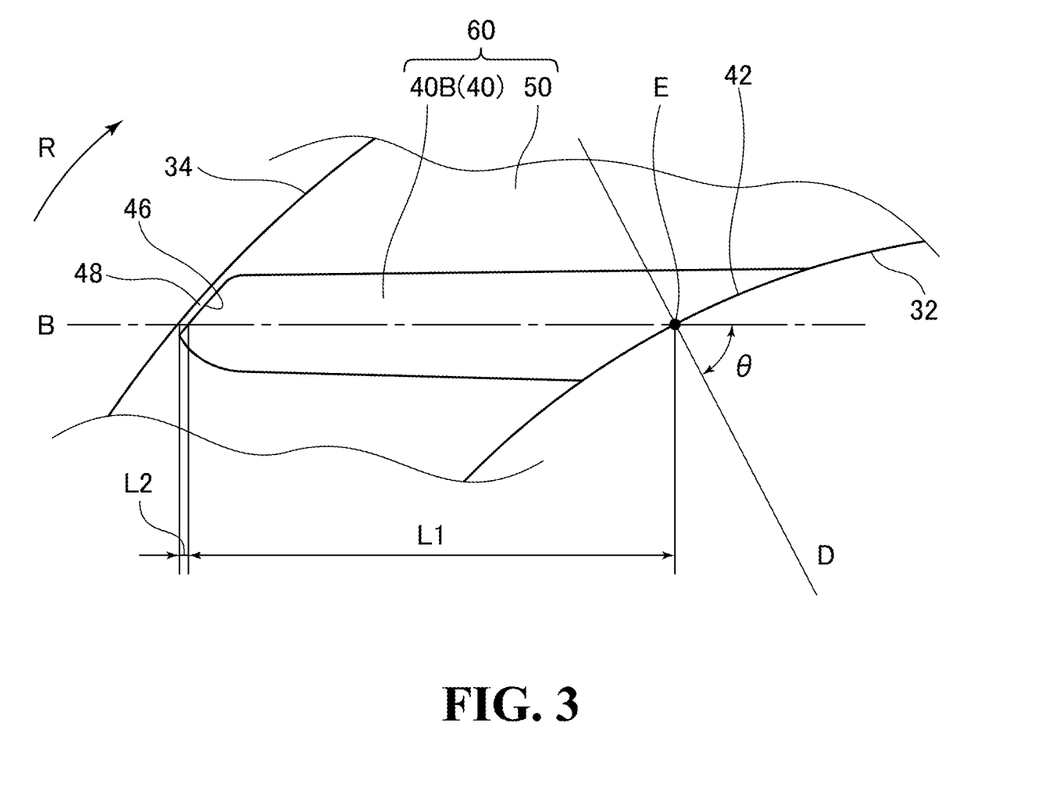
FIG. 3 is a schematic sectional view for illustrating an example of a planar shape of the oil groove.

FIG. 3 is an enlarged plan view for illustrating an example of a planar shape of the oil groove 40. More specifically, FIG. 3 is an enlarged view of the non-communicating oil groove 40B illustrated in FIG. 1. As illustrated in FIG. 3, an oil groove angle θ is defined as an angle formed between the center line B of the oil groove 40 in the longitudinal direction and a radial direction D (straight line passing through the center axis C illustrated in FIG. 1) of the ring-shaped member 30, which has an intersection E as a vertex. The center line B of the oil groove 40 in the longitudinal direction and the radial direction D of the ring-shaped member 30 intersect at the intersection E.

Further, when a distance between adjacent two of the oil grooves 40 in the circumferential direction of the ring-shaped member 30 is expressed in angle with the center axis C of the ring-shaped member 30 as a vertex, the distance is defined as an angle formed between a straight line connecting the intersection E at one of the oil grooves 40 and the center axis C and a straight line connecting the intersection E at another one of the oil grooves 40 and the center axis C.

For the non-communicating oil groove 40B, the recessed portion that forms the groove is formed continuously so as to extend from the opening portion 42 at the inner peripheral end 32 to the vicinity of the outer peripheral end 34. In this case, the expression "extending to the vicinity of the outer peripheral end 34" means that an oil groove length ratio expressed by Expression (2) is equal to or larger than 0.90.

$$\text{Oil groove length ratio} = L1/(L1 + L2) \qquad \text{Expression (2)}$$

In Expression (2), L1 represents a length (mm) of the non-communicating oil groove 40B in the longitudinal direction, and L2 represents a length (mm) from an outer periphery-side most distal end portion 46 of the non-communicating oil groove 40B to the outer peripheral end 34 of the ring-shaped member 30 in a direction parallel to the longitudinal direction of the non-communicating oil groove 40B. A portion surrounded by the outer periphery-side most distal end portion 46 of the non-communicating oil groove 40B and the outer peripheral end 34 of the ring-shaped member 30 functions as a wall (oil stop wall 48) configured to inhibit outflow of the lubricating oil inside the non-communicating oil groove 40B toward the outer periphery of the ring-shaped member 30. The length L1 of the non-communicating oil groove 40B and a thickness (length L2) of the oil stop wall 48 are lengths on a straight line parallel to the center line B in the longitudinal direction illustrated in FIG. 3. The lengths L1 and L2 are determined at a position at which the thickness of the oil stop wall 48 has a minimum value. Thus, when the thickness of the oil stop wall 48 has a minimum value on the center line B in the longitudinal direction, the lengths L1 and L2 are only required to be determined on the center line B in the longitudinal direction. When the length of the oil stop wall 48 has a minimum value at a position shifted from the center line B in the longitudinal direction, the lengths L1 and L2 are only required to be determined at this position.

An upper limit of the oil groove length ratio is only required to be less than 1.00. In view of securing strength of the oil stop wall 48 to suppress damage, it is preferred that the upper limit of the oil groove length ratio be equal to or smaller than 0.995. Further, in view of achievement of the effect of reducing the torque and the abrasion and decreasing the torque amplitude width to suppress the oil stain and the suppression of damage to the oil stop wall 48 in a well-balanced manner, the oil groove length ratio preferably falls within a range of from 0.90 to 0.99, more preferably, from 0.91 to 0.99, further preferably, from 0.95 to 0.99.

Further, the communicating oil grooves 40A and the non-communicating oil grooves 40B are arranged with periodic regularity in the circumferential direction of the ring-shaped member 30. When this condition is satisfied, the arrangement of two kinds of the oil grooves 40 has the highest symmetricity in the circumferential direction. Thus, the oil film distribution in the circumferential direction can more easily be set uniform. To satisfy the above-mentioned condition, it is required that a total number of the oil grooves 40 be four or more and a total number of the communicating oil grooves 40A be two or more.

The expression "arrangement of the communicating oil grooves 40A and the non-communicating oil grooves 40B with periodic regularity in the circumferential direction of the ring-shaped member 30" means that arrangement units, each including one or more non-communicating oil grooves 40B and one or more communicating oil grooves 40A arranged in order along the circumferential direction, are repeated for X times (X is an integer equal to or larger than 2) over the entire circumference (from 0 degrees to 360 degrees) in the circumferential direction. A state of arrangement of two kinds of the oil grooves 40 can be expressed by Expression (3) or using "(A, B)" in Expression (3).

$$(A, B) \times X \qquad \text{Expression (3)}$$

In Expression (3), (A, B) represents the arrangement unit, X represents the number (integer value equal to or larger than 1) of repetitions of the arrangement unit over the entire circumference (from 0 degrees to 360 degrees) in the circumferential direction, A represents a total number (integer value equal to or larger than 1) of the communicating oil grooves 40A included in the arrangement unit, and B represents a total number (integer value equal to or larger than 1) of the non-communicating oil grooves 40B included in the arrangement unit. Further, the arrangement unit (A, B) represents that, when a given position in the circumferential direction is defined as 0 degrees, A communicating oil grooves 40A are arranged in order and B non-communicating oil grooves 40B are then arranged in order along the circumferential direction from the position at 0 degrees as a starting point.

The arrangement with periodic regularity corresponds to a case in which A and B are each equal to or larger than 1, and X is equal to or larger than 2 in Expression (3). For example, the arrangement with periodic regularity illustrated in FIG. 1 is expressed as (1, 2)×4. In this case, a set of two kinds of the oil grooves 40 included in oil grooves No. 3 to No. 5 in FIG. 1 and Table 1, a set of two kinds of the oil grooves 40 included in oil grooves No. 6 to No. 8, a set of two kinds of the oil grooves 40 included in oil grooves No. 9 to No. 11, and a set of two kinds of the oil grooves 40 included in oil grooves No. 12, No. 1, and No. 2 each form one arrangement unit (1, 2). Other examples of the arrangement with periodic regularity include, for example, (1, 2)×3, (1, 1)×6, (1, 3)×3, and (2, 1)×4.

Suitable arrangement units (A, B) include (1, 2), (1, 1), and (2, 1). In particular, the arrangement unit (1, 2) is preferred. Further, the number X of repetitions of the arrangement unit (A, B) is not limited to a particular number as long as the number X is equal to or larger than 2. However, the number X preferably falls within a range of from 2 to 8, more preferably, from 3 to 6.

Meanwhile, an arrangement without periodic regularity corresponds to the following cases. Specifically, the arrangement of the oil grooves 40 arranged on the oil groove carrying surface 60 includes only one arrangement unit, and thus does not have periodicity (repeatability of the arrangement unit), for example, an arrangement expressed by (1, 9)×1. The arrangement of the oil grooves 40 includes two or more different kinds of arrangement units (A, B), for example, the arrangement units (A, B) are arranged in the order of (1, 1), (2, 1), (1, 1), and (2, 1) from 0 degrees toward 360 degrees. The arrangement unit (A, B) has 0 as any one of A and B.

Further, the resin thrust washer 20 according to this embodiment has the communicating oil groove area ratio falling within a range of from 0.15 to 0.85. This communicating oil groove area ratio enables even and easy supply of a proper amount of lubricating oil onto the entire sliding surfaces 50. Thus, a uniform oil film can easily be formed. As a result, the torque and the abrasion are reduced, and the torque amplitude width is decreased to enable suppression of the oil stain. The communicating oil groove area ratio preferably falls within a range of from 0.230 to 0.680, more preferably, from 0.310 to 0.520, further preferably, from 0.310 to 0.350.

A planar shape of the oil groove 40 is not limited to a particular shape. In general, it is particularly preferred that the planar shape of the oil groove 40 be a band-like shape basically having a constant (substantially constant or completely constant) groove width with respect to the longitudinal direction as exemplified in FIG. 1. However, a groove width of the communicating oil groove 40A in the vicinity of the inner peripheral end 32 and the vicinity of the outer peripheral end 34 may be different from that in the vicinity of a central part thereof in the longitudinal direction, and a groove width of the non-communicating oil groove 40B in the vicinity of the inner peripheral end 32 and the vicinity of the distal end portion on the outer periphery side may be different from that in the vicinity of a central part thereof in the longitudinal direction. Further, it is preferred that the planar shapes of the oil grooves 40 be the same (substantially the same or completely the same) except that the planar shape of each of the communicating oil grooves 40A and the planar shape of each of the non-communicating oil grooves 40B are different from each other in the vicinity of the outer peripheral end 34. However, at least one of the oil grooves 40 may have a partially increased groove width in the vicinity of the opening portions 42 as needed.

Further, plane areas of the oil grooves 40 may be different from each other. In view of facilitation of ensuring uniformity of the oil film distribution, however, it is preferred that the plane areas of the oil grooves 40 be the same (substantially the same or completely the same). In this case, the expression "the same plane area of the oil grooves 40" means that the plane area of each of the oil grooves 40 falls within a range of ±15%, preferably, within a range of ±10%, with respect to an average value of the plane areas of the oil grooves 40.

Sectional shapes and sectional areas of the oil grooves 40, which are taken in the vicinity of the central part in the longitudinal direction, may be different from each other. In view of ease of manufacturing of the resin thrust washer 20, however, it is preferred that the sectional shapes and the sectional areas of the oil grooves 40 be the same (substantially the same or completely the same).

Further, the oil groove carrying surface 60 is not limited to a particular one as long as the oil groove carrying surface 60 includes the sliding surfaces 50 and two kinds of the oil grooves 40 (communicating oil grooves 40A and non-communicating oil grooves 40B). For example, the oil groove carrying surface 60 may further include an oil reservoir portion. The oil reservoir portion is formed to be recessed with respect to the sliding surfaces 50, and does not communicate with any of the inner peripheral end 32 or the outer peripheral end 34. In view of ensuring the uniformity of the oil film distribution of the oil film formed on the sliding surfaces 50, however, it is suitable that the oil groove carrying surface 60 only have the sliding surfaces 50 and two kinds of the oil grooves 40 (communicating oil grooves 40A and non-communicating oil grooves 40B).

Only any one of the front surface and the back surface of the ring-shaped member 30 of the resin thrust washer 20 according to this embodiment may slide against another member, or each of the front surface and the back surface may slide against another member. When only any one of the front surface and the back surface of the ring-shaped member 30 slides against another member, the sliding surface corresponds to the oil groove carrying surface 60 that satisfies the above-mentioned conditions (a) to (g). In this case, a surface shape of the surface (non-sliding surface, specifically, a surface opposite to the oil groove carrying surface 60) that does not slide against another member is not limited to a particular shape. The non-sliding surface may have a projecting portion and/or a recessed portion as needed. For example, the non-sliding surface may have a projecting portion (and/or a recessed portion) to be fitted to a counterpart member so as to fix the resin thrust washer 20 to the counterpart member arranged on the non-sliding surface. Meanwhile, when each of the front surface and the back surface of the ring-shaped member 30 slides against another member, at least one of the surfaces is only required to be the oil groove carrying surface 60 that satisfies the conditions (a) to (g) described above.

The ring-shaped member 30 included in the resin thrust washer 20 according to this embodiment is made of a material (base material) containing a resin. In this case, examples of the material (base material) containing a resin include (1) a material containing a resin alone and (2) a material containing a mixture of a resin and at least one additive selected from the group consisting of fillers and elastomers. In the latter case (2), a ratio of the resin to the material containing the resin is not limited to a particular ratio. In general, it is preferred that the ratio be equal to or larger than 30% by mass, preferably, equal to or larger than 40% by mass.

Any known resin may be utilized as the resin, and examples thereof include a tetrafluoroethylene resin (PTFE), a polyamide resin (PA), a polyamide imide resin (PAI), a polyimide resin (PI), a polybenzimidazole resin (PBI), aromatic polyether ketones (PAEK), a modified polyether ketone resin, a polyether ether ketone resin (PEEK), a polyphenylene sulfide resin (PPS), a crystalline polymer, a phenol resin, a polyethylene resin, a polystyrene resin, an acrylic resin, an acrylonitrile butadiene styrene resin, a polyacetal resin, a polycarbonate resin, a polyether sulfone resin (PES), a polyether imide resin (PEI), a mixture of these resins, and a copolymer obtained by copolymerizing polymerizable monomers to be used for polymerization of these resins.

Any known filler may be utilized as the filler, and examples thereof may include a tetrafluoroethylene resin (PTFE), manganese sulfide (MnS), molybdenum disulfide ($MoS_2$), graphite, calcium carbonate ($CaCO_3$), titanium oxide, and melamine cyanurate (MCA). Those fillers may be used in combination thereof. In addition, the form of the filler is not particularly limited, and may be, for example, a particulate form or a fibrous form.

Further, it is suitable to use reinforced fiber having an average fiber length falling within a range of, for example, from about 0.0001 mm to about 5 mm as a fibrous filler (fibrous material). For example, inorganic fibrous materials such as carbon fiber, glass fiber, and potassium titanate fiber and organic fibrous materials such as aramid fiber and fluorine fiber are exemplified. However, as a matter of course, other fibrous materials may be used. Further, two or more kinds of fibrous materials may be used in combination.

When the fibrous material is glass fiber, it is suitable that the glass fiber is contained in the base material at 1% to 40% by mass. Further, when the fibrous material is carbon fiber or aramid fiber, it is suitable that the carbon fiber or the aramid fiber is contained in the base material at 1% to 45% by mass. Further, when the fibrous material is fluorine fiber, it is suitable that the fluorine fiber is contained in the base material at 5% to 55% by mass. Further, when the fibrous material is potassium titanate fiber, it is suitable that the potassium titanate fiber is mixed at a weight ratio falling within a range of from 0.1% to 5% by mass per item.

Publicly known elastomers may be suitably used as the elastomer. Examples of the elastomers include vulcanized rubbers such as synthetic rubbers and natural rubbers and resin-based elastomers such as silicone rubbers, urethane rubbers, and fluororubbers. Two or more kinds of elastomers selected from the elastomers described above may be used in combination.

Further, the surfaces of the ring-shaped member 30 may be subjected to a surface treatment (including a surface modification treatment in this case) as needed. Examples of the surface treatment include a surface modification treatment using epoxy silane (manufactured by Shin-Etsu Chemical Co., Ltd.) and a surface modification treatment using a titanate-based or aluminate-based coupling agent (more specifically, bis (dioctylpyrophosphate) isopropoxy titanate, manufactured by Ajinomoto Fine-Techno Co., Ltd. under a commercial name of 38S), and a surface modification treatment using bis (dioctylpyrophosphate) oxyacetate titanate, manufactured by Ajinomoto Fine-Techno Co., Ltd. under a commercial name of 138S), a commercial name 55 (manufactured by Ajinomoto Fine-Techno Co., Ltd.), and a surface modification treatment using acetoalkoxy aluminum diisopropylate, manufactured by Ajinomoto Fine-Techno Co., Ltd. under a commercial name of AL-M). Any one or a plurality of surface treatments (surface modification treatments) may be selected from the surface treatments described above and conducted. Further, in place of the surface treatments (surface modification treatments) described above, a coupling treatment using corona discharge or ion plasma discharge may be conducted. In place of the surface modification treatments described above, a DLC treatment or Mo-coating may be conducted. In particular, the DLC treatment enables a reduction in friction and improvement of abrasion resistance in a sliding area, and thus is preferred.

A purpose of use of the resin thrust washer 20 according to this embodiment is not limited to a particular purpose. The resin thrust washer 20 may be used for various kinds of mechanical apparatus without restriction, in particular, a mechanical apparatus including a power transmission mechanism using a rotary member. Examples of such a mechanical apparatus include various kinds of transmissions such as a continuously variable transmission (CVT) to be used for, for example, a vehicle and a compressor used for, for example, an air compressor. Further, in a mechanical apparatus using the resin thrust washer 20 according to this embodiment, the resin thrust washer 20 is arranged between a pair of counterpart members, and is used under an environment where lubricating oil is supplied. The resin thrust washer 20 may be used as a thrust washer for forming a combined thrust washer that is formed by placing and combining two or more thrust washers in an overlapped manner or is not required to be used as the combined thrust washer.

EXAMPLES

Now, the present invention is described with examples. However, the present invention is not limited only to the examples described below.

1. Preparation of Evaluation Thrust Washers

The ring-shaped member 30 having the oil grooves 40 formed as shown in Table 2 and Table 3 by injection molding was used as each of the resin thrust washers 20 of Examples and resin thrust washers of Comparative Examples (hereinafter referred to collectively as "evaluation thrust washers"). The manufactured ring-shaped member 30 has the following main specifications.

(1) A material of the ring-shaped member 30 is a polyphenylene sulfide resin containing an inorganic filler dispersed therein.

(2) No surface treatment is conducted on the ring-shaped member 30.

(3) The oil grooves 40 are formed only on one of the surfaces of the ring-shaped member 30.

(4) The oil grooves 40 are arranged:
(i) with a total number of the oil grooves 40, a total number of the communicating oil grooves 40A, the arrangement of the oil grooves 40 in the circumferential direction, the oil groove angle, and the oil groove length ratio, which are shown in Table 2 and Table 3; and
(ii) at equal intervals in the circumferential direction.

In Table 2 and Table 3, the "arrangement pattern of oil grooves" is expressed as in Expression (3). For Comparative Example 4 having two kinds of arrangement units (A, B) as the arrangement pattern of the oil grooves 40, however, the arrangement units (A, B) in Expression (3) are listed in order along the entire circumference (from 0 degrees to 360 degrees) in the circumferential direction.

Further, in each of Examples and Comparative Examples, each of the oil grooves 40 formed in the ring-shaped member 30 has a band-like planar shape as exemplified in FIG. 1. The oil grooves 40 are set to have the same plane areas regardless of the kinds of oil grooves 40, and the oil grooves 40 are set to have substantially the same sectional areas and sectional shapes. Further, in Examples and Comparative Examples, a ratio of an area of the sliding surfaces 50 to an area of the oil groove carrying surface 60 is set substantially the same. Example 3 corresponds to FIG. 1.

2. Test

Figure 4:
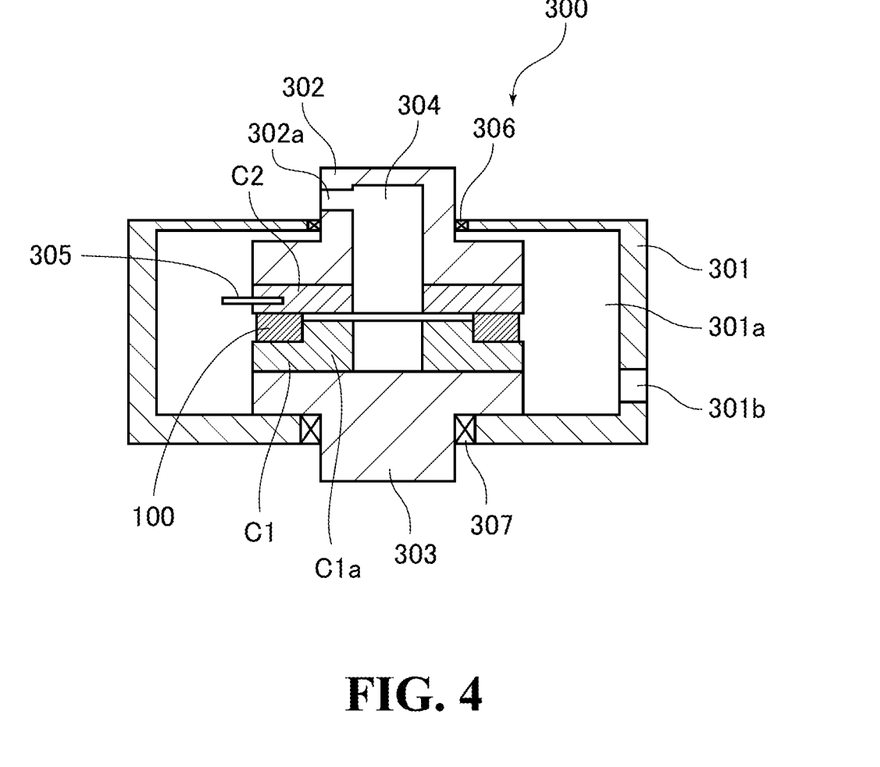
FIG. 4 is a schematic sectional view for illustrating a configuration of a sliding tester used for evaluations of evaluation thrust washers.

For various evaluations of the evaluation thrust washers, a sliding tester 300 illustrated in FIG. 4 was used. The sliding tester 300 includes an oil pan 301 having a cylindrical shape. The lubricating oil is supplied from an oil tank (not shown) to an inner cylindrical portion 301a of the oil pan 301. Further, the oil pan 301 has an oil discharge port 301b. The oil discharge port 301b is an opening portion configured to discharge the lubricating oil in the inner cylindrical portion 301a to an outside, and has a mechanism for forcibly discharging the lubricating oil with use of a pump.

Further, the sliding tester 300 includes a fixed shaft 302 and a rotary shaft 303. The fixed shaft 302 is a shaft that is not rotated relative to the oil pan 301. However, a load in a pressing direction is applied to the fixed shaft 302 by load application means (not shown). Further, a counterpart member C2 made of high tensile strength steel is mounted to the fixed shaft 302 under a state in which the counterpart member C2 is not rotated with respect to the fixed shaft 302.

Further, the rotary shaft 303 is a shaft to be rotated with respect to the oil pan 301. Thus, a driving force for causing rotation is applied to the rotary shaft 303 by rotating-force application means (not shown). Further, a counterpart member C1 made of high tensile strength steel is mounted to the rotary shaft 303 under a state in which the counterpart member C1 is not rotated with respect to the rotary shaft 303. One counterpart member C1 has a shaft-shaped portion C1a for mounting the evaluation thrust washer 100 thereto. Meanwhile, another counterpart member C2 is formed in a disc-like shape. Thus, a dimension of the one counterpart member C1 in an axial direction thereof is set larger than a dimension of the another counterpart member C2 for the presence of the shaft-shaped portion C1a.

As illustrated in FIG. 4, a center hole is formed to pass through each of the fixed shaft 302, the counterpart member C1, and the another counterpart member C2 (reference symbols thereof are omitted). The center holes are aligned in such a manner as to be continuous in the axial direction to form an oil supply path 304 configured to allow the lubricating oil to flow therethrough. The fixed shaft 302 has an oil supply port 302a, which is an opening portion configured to supply the lubricating oil to the oil supply path 304. Further, a thermocouple 305 is mounted to the counterpart member C2. The thermocouple 305 is a portion configured to measure a sliding surface temperature of the counterpart member C2. An oil seal 306 is provided in an opening portion (reference symbol thereof is omitted) of the oil pan 301, which is configured to allow insertion of the fixed shaft 302 into the inner cylindrical portion 301a. Further, an oil seal 307 is also provided in an opening portion of the oil pan 301, which is configured to allow insertion of the rotary shaft 303 into the inner cylindrical portion 301a.

For a sliding test, the evaluation thrust washer 100 was fixed to the counterpart member C1, and was placed in the sliding tester 300 so that the surface having the oil grooves 40 was opposed to the counterpart member C2. Then, the sliding tester 300 was driven under a state in which a given load was applied by load supply means while lubricating oil (oil type: ATF) was being supplied. Under this state, a sliding test was conducted. The test conditions for Examples and Comparative Examples were the same except for the evaluation thrust washers 100 used in the test.

3. Evaluations

A sliding test was conducted to measure a torque and a torque amplitude amount during the sliding test. An abrasion amount of the ring-shaped member 30 and oil stain on the ring-shaped member 30 were evaluated after the sliding test. Results are shown in Table 2 and Table 3. Details of measurement conditions for the torque and the torque amplitude amount, an evaluation method for the abrasion amount, and an evaluation method and evaluation criteria for the oil stain are as follows.

(1) Measurement Conditions for Torque

The torque was measured about every thirty minutes within a period of one to twenty hours from start of the sliding test. Average values of the torques in the period are shown in Table 2 and Table 3. When the torque temporarily has an abnormal value due to, for example, intrusion of a foreign matter between the evaluation thrust washer 100 and the counterpart member C1 (or the counterpart member C2), the abnormal value is excluded from measurement values used for a calculation of the average value of the torques. Further, it is suitable that the torques shown in Table 2 and Table 3 are as small as possible. As a rough index of a minimum value, it is suitable that the torque is equal to or smaller than 1.02 Nm.

(2) Measurement Conditions for Torque Amplitude Amount

The torque amplitude amount was measured at short intervals, that is, about every 0.2 seconds in a period of one to twenty hours from the start of the sliding test. Average values of the torque amplitude amounts in the period are shown in Table 2 and Table 3. When the torque amplitude amount temporarily has an abnormal value due to, for example, intrusion of a foreign matter between the evaluation thrust washer 100 and the counterpart member C1 (or the counterpart member C2), the abnormal value is excluded from measurement values used for a calculation of the average value of the torque amplitude amounts. Further, it is suitable that the torque amplitude amounts shown in Table 2 and Table 3 are as small as possible. As a rough index of a minimum value, it is suitable that the torque amplitude amount is equal to or smaller than 0.17 Nm.

(3) Evaluation Method for Abrasion Amount

The abrasion amount was obtained from a difference between a groove depth (height from a bottom portion of the oil groove 40 to the sliding surface 50 located in the vicinity of the bottom portion before occurrence of abrasion) of the oil groove 40 before the start of the sliding test and a groove depth (height from the bottom portion of the oil groove 40 to the sliding surface 50 located in the vicinity of the bottom portion after the occurrence of abrasion) of the oil groove 40 after end of the sliding test (twenty hours after the start of the sliding test). The groove depth was measured for all the oil grooves 40 formed in the oil groove carrying surface 60, and was measured at five positions for one oil groove 40. Five division points for dividing the oil groove 40 into six in the radial direction were selected as measurement positions.

Average values of the abrasion amounts measured at the measurement points are shown in Table 2 and Table 3. It is suitable that the abrasion amounts shown in Table 2 and Table 3 are as small as possible. As a rough index of a minimum value, it is suitable that the abrasion amount is equal to or smaller than 25 μm.

(4) Evaluation Method and Evaluation Criteria for Oil Stain

The oil stain was evaluated through observation with an optical microscope in the following manner. The evaluation thrust washer 100 was washed to remove the lubricating oil after the completion of the sliding test (twenty hours after the start of the sliding test). Then, occurrence of discoloration (oil stain) was observed along an outline of each of the oil grooves 40 formed in the oil groove carrying surface 60. The oil stain was mainly observed only at a position along the outline of the oil groove 40. Thus, the observation was carried out at the positions along the outline of the oil groove 40 to evaluate the oil stain. Evaluation criteria for the oil stain, which are shown in Table 2 and Table 3, are as follows.

A: A ratio of an area with the oil stain to a total length of the outlines of all the oil grooves 40 formed in the oil groove carrying surface 60 is equal to or smaller than 30%.

B: The ratio of an area with the oil stain to the total length of the outlines of all the oil grooves 40 formed in the oil groove carrying surface 60 is larger than 30% and equal to or smaller than 40%.

C: The ratio of an area with the oil stain to the total length of the outlines of all the oil grooves 40 formed in the oil groove carrying surface 60 is larger than 40%.

TABLE 2

| | Total number of oil grooves | Total number of communicating oil grooves | Arrangement of oil grooves | | Oil groove angle (degrees) | Oil groove length ratio | Torque | | Abrasion amount (μm) | Oil stain |
| | | | Communicating oil groove area ratio | Periodic regularity | Arrangement pattern of oil grooves | | | Torque (N·m) | amplitude width (N·m) | | |
| --- | --- | --- | --- | --- | --- | --- | --- | --- | --- | --- | --- |
| Example 1 | 12 | 2 | 0.167 | YES | (1, 5) × 2 | 61 | 0.97 | 0.90 | 0.13 | 16 | A |
| Example 2 | 12 | 3 | 0.250 | YES | (1, 3) × 3 | 61 | 0.97 | 0.82 | 0.09 | 12 | A |
| Example 3 | 12 | 4 | 0.333 | YES | (1, 2) × 4 | 61 | 0.97 | 0.71 | 0.07 | 12 | A |
| Example 4 | 12 | 6 | 0.500 | YES | (1, 1) × 6 | 61 | 0.97 | 0.75 | 0.07 | 12 | A |
| Example 5 | 12 | 8 | 0.667 | YES | (2, 1) × 4 | 61 | 0.97 | 0.85 | 0.11 | 14 | A |
| Example 6 | 12 | 10 | 0.833 | YES | (5, 1) × 2 | 61 | 0.97 | 0.88 | 0.11 | 16 | A |
| Example 7 | 12 | 4 | 0.333 | YES | (1, 2) × 4 | 40 | 0.97 | 0.91 | 0.09 | 14 | A |
| Example 8 | 12 | 4 | 0.333 | YES | (1, 2) × 4 | 73 | 0.97 | 0.97 | 0.10 | 10 | B |
| Example 9 | 4 | 2 | 0.500 | YES | (1, 1) × 2 | 61 | 0.97 | 0.50 | 0.17 | 25 | B |
| Example 10 | 6 | 2 | 0.333 | YES | (1, 2) × 2 | 61 | 0.97 | 0.50 | 0.15 | 22 | B |
| Example 11 | 8 | 2 | 0.250 | YES | (1, 3) × 2 | 61 | 0.97 | 0.60 | 0.14 | 20 | A |
| Example 12 | 18 | 6 | 0.333 | YES | (1, 2) × 6 | 45 | 0.97 | 0.93 | 0.13 | 10 | B |
| Example 13 | 20 | 10 | 0.500 | YES | (1, 1) × 10 | 45 | 0.97 | 1.00 | 0.11 | 17 | B |

TABLE 3

| | Total number of oil grooves | Total number of communicating oil grooves | Arrangement of oil grooves | | Oil groove angle (degrees) | Oil groove length ratio | Torque | | Abrasion amount (μm) | Oil stain |
| | | | Communicating oil groove area ratio | Periodic regularity | Arrangement pattern of oil grooves | | | Torque (N·m) | amplitude width (N·m) | | |
| --- | --- | --- | --- | --- | --- | --- | --- | --- | --- | --- | --- |
| Example 14 | 15 | 5 | 0.333 | YES | (1, 2) × 5 | 45 | 0.97 | 0.92 | 0.13 | 12 | B |
| Example 15 | 12 | 6 | 0.500 | YES | (1, 1) × 6 | 40 | 0.97 | 0.97 | 0.10 | 16 | B |
| Example 16 | 12 | 6 | 0.500 | YES | (1, 1) × 6 | 73 | 0.97 | 1.01 | 0.10 | 12 | B |
| Example 17 | 12 | 4 | 0.333 | YES | (1, 2) × 4 | 56 | 0.97 | 0.72 | 0.08 | 13 | A |
| Example 18 | 12 | 4 | 0.333 | YES | (1, 2) × 4 | 61 | 0.91 | 1.02 | 0.16 | 19 | B |
| Comparative Example 1 | 18 | 2 | 0.111 | YES | (1, 1) × 9 | 45 | 0.97 | 1.29 | 0.19 | 26 | C |

TABLE 3-continued

|  | Total number of oil grooves | Total number of communicating oil grooves | Communicating oil groove area ratio | Periodic regularity | Arrangement pattern of oil grooves | Oil groove angle (degrees) | Oil groove length ratio | Torque (N · m) | Torque amplitude width (N · m) | Abrasion amount (μm) | Oil stain |
|---|---|---|---|---|---|---|---|---|---|---|---|
| Comparative Example 2 | 18 | 16 | 0.889 | YES | (8, 1) × 9 | 45 | 0.97 | 1.05 | 0.16 | 18 | B |
| Comparative Example 3 | 12 | 1 | 0.083 | NO | (1, 11) × 1 | 61 | 0.97 | 1.65 | 0.25 | 29 | C |
| Comparative Example 4 | 12 | 5 | 0.417 | NO | (1, 1), (1, 2), (1, 1), (1, 1), (1, 2) | 61 | 0.97 | 1.52 | 0.21 | 27 | C |
| Comparative Example 5 | 12 | 4 | 0.333 | YES | (1, 2) × 4 | 35 | 0.97 | 1.05 | 0.17 | 18 | B |
| Comparative Example 6 | 12 | 4 | 0.333 | YES | (1, 2) × 4 | 0 | 0.97 | 1.30 | 0.17 | 22 | C |
| Comparative Example 7 | 12 | 4 | 0.333 | YES | (1, 2) × 4 | 61 | 0.85 | 1.25 | 0.16 | 20 | C |
| Comparative Example 8 | 6 | 0 | 0.000 | NO | (0, 6) × 1 | 0 | 0.97 | 1.31 | 0.26 | 30 | C |

REFERENCE SIGNS LIST

20: resin thrust washer
30: ring-shaped member
32: inner peripheral end
34: outer peripheral end
40: oil groove
40A: communicating oil groove
40B: non-communicating oil groove
42, 44: opening portion
46: outer periphery-side most distal end portion
48: oil stop wall
50: sliding surface
60: oil groove carrying surface
100: evaluation thrust washer
300: sliding tester
301: oil pan
301a: inner cylindrical portion
301b: oil discharge port
302: fixed shaft
302a: oil supply port
303: rotary shaft
304: oil supply path
305: thermocouple
306, 307: oil seal

The invention claimed is:

1. A thrust washer, comprising a ring-shaped member made of a material containing a resin, the ring-shaped member having a front surface and a back surface,
   wherein at least one of the front surface or the back surface of the ring-shaped member slides against another member,
   wherein at least one of the front surface or the back surface has four or more oil grooves, each being a flow path for lubricating oil,
   wherein an oil groove carrying surface is a surface to slide against the another member,
   wherein the oil grooves each have a longitudinal direction that forms an angle falling within a range of from 40 degrees to 75 degrees with respect to a radial direction of the ring-shaped member, and are arranged at equal intervals in a circumferential direction of the ring-shaped member,
   wherein the oil grooves are formed of (i) communicating oil grooves, each having opening portions at an inner peripheral end and an outer peripheral end of the ring-shaped member, respectively, and each being a recessed portion formed continuously to connect the opening portion at the inner peripheral end and the opening portion at the outer peripheral end, and (ii) non-communicating oil grooves, each having an opening portion only at the inner peripheral end of the ring-shaped member, and each being a recessed portion formed continuously to extend from the opening portion at the inner peripheral end to a vicinity of the outer peripheral end,
   wherein a total number of the communicating oil grooves is two or more,
   wherein the communicating oil grooves and the non-communicating oil grooves are arranged with periodic regularity in the circumferential direction of the ring-shaped member, and
   wherein a communicating oil groove area ratio expressed by Expression (1):

Communicating oil groove area ratio=$S1/(S1+S2)$ falls within a range of from 0.15 to 0.85, where S1 represents a sum of plane areas (mm$^2$) of first to n-th communicating oil grooves, S2 represents a sum of plane areas (mm$^2$) of first to m-th non-communicating oil grooves, "n" represents a total number of the communicating oil grooves, and "m" represents a total number of the non-communicating oil grooves.

2. The thrust washer according to claim 1, wherein a total number of the oil grooves falls within a range of from 6 to 18.

3. The thrust washer according to claim 1, wherein the communicating oil groove area ratio falls within a range of from 0.230 to 0.680.

4. The thrust washer according to claim 1, wherein the communicating oil groove area ratio falls within a range of from 0.310 to 0.520.

5. The thrust washer according to claim 1, wherein the angle formed between the longitudinal direction of each of the oil grooves and the radial direction of the ring-shaped member falls within a range of from 40 degrees to 65 degrees.

6. The thrust washer according to claim 1, wherein an oil groove length ratio expressed by Expression (2):

Oil groove length ratio=$L1/(L1+L2)$ falls within a range of from 0.90 to 0.99, where L1 represents a length (mm) in a longitudinal direction of a non-communicating oil groove of the non-communicating oil grooves, and L2 represents a length from an outer periphery-side most distal end portion of the non-communicating oil groove to the outer peripheral end of the ring-shaped member in a direction parallel to the longitudinal direction of the non-communicating oil groove.

7. The thrust washer according to claim 6, wherein the oil groove length ratio falls within a range of from 0.95 to 0.99.

8. The thrust washer according to claim 1, wherein the resin comprises a polyphenylene sulfide resin.

* * * * *